United States Patent [19]

Bishop

[11] 4,280,972
[45] Jul. 28, 1981

[54] COMBINATION THERMOPLASTIC AND GLASS LOADED THERMOSETTING INJECTION MOLDING MACHINE AND METHOD FOR OPERATING SAME

[75] Inventor: Thomas G. Bishop, Mount Gilead, Ohio

[73] Assignee: HPM Corporation, Mount Gilead, Ohio

[21] Appl. No.: 80,486

[22] Filed: Oct. 1, 1979

[51] Int. Cl.³ .................... B29F 1/02; B29G 3/00
[52] U.S. Cl. ........................... 264/39; 264/297; 264/328.4; 264/328.18; 425/185; 425/190; 425/192 R
[58] Field of Search .............. 264/39, 329, 297, 328 A, 264/328.18; 425/185, 190, 192 R

[56] References Cited
U.S. PATENT DOCUMENTS

| | | |
|---|---|---|
| 2,734,226 | 2/1956 | Willert . |
| 3,165,785 | 1/1965 | Hehl . |
| 3,406,429 | 10/1968 | Draudt . |
| 3,810,728 | 5/1974 | Jacobs ........................ 425/147 X |
| 3,981,655 | 9/1976 | Horbach ...................... 425/190 X |
| 4,123,488 | 10/1978 | Lawson ........................ 264/255 X |

*Primary Examiner*—Thomas P. Pavelko
*Attorney, Agent, or Firm*—Albert L. Jeffers; John F. Hoffman

[57] ABSTRACT

An injection molding machine which is capable of injecting both thermoplastic compounds and glass loaded thermosetting polyester compounds, wherein the machine is capable of rapid conversion from its thermoplastic configuration to its thermosetting configuration, and vice versa. The machine comprises an elongated charge forming barrel having a rearward thermoplastic feed opening, which is customarily supplied by pelletized thermoplastic material from a vertical feed hopper, and a thermosetting material feed opening extending into the barrel at a position forwardly of the thermoplastics feed opening. When processing thermoplastics materials, a conventional, fully flighted plasticizing screw is installed in the barrel so that the pelletized material is conveyed forwardly from the rear feed opening, and plasticized for subsequent injection. During thermoplastics processing, the thermosetting feed opening is plugged. To convert the machine to process the aforementioned thermosetting materials, the second feed opening is unplugged, and the plasticizing screw is exchanged for a deeper flighted conveying screw having flights extending from the forward end thereof to just behind the unplugged, second opening. A stuffer unit is then attached to the unplugged feed opening and dough-like glass loaded thermosetting material is forced through the second opening into the barrel by means of a reciprocating plunger, or the like. The thermosetting material is conveyed forwardly and mixed slightly as the screw rotates.

7 Claims, 6 Drawing Figures

COMBINATION THERMOPLASTIC AND GLASS LOADED THERMOSETTING INJECTION LOADED MOLDING MACHINE AND METHOD FOR OPERATING SAME

BACKGROUND OF THE INVENTION

The present invention relates to injection molding machines, and in particular to such a machine which is capable of processing both thermoplastic compounds and glass loaded thermosetting polyester compounds, such as bulk molding compounds, with easy conversion between the two modes of operation. The invention also relates to the method of converting the machine from the thermoplastic mode to the thermosetting mode, and vice versa.

Plastics materials which are becoming increasingly important and more widely used are thermosetting polyester compounds reinforced with glass fibers, and other types of fibers. An important application of components made of this type of molding compound is in the automotive industry where improved mileage requirements have necessitated the substitution of plastic parts for those which have customarily been made of metal. For example, the headlamp housing and front trim component for automobiles has customarily been made of a chrome plated metal, but, due to the strength and rigidity afforded by fiber reinforced bulk molding compounds (BMC), this component can be made entirely of such a material. Although this type of component can be made by compression molding or transfer molding techniques, these techniques are not particularly suited to high production due to the high degree of hand labor required and the long cycle time. The advantages of injection molding glass reinforced polyester compounds are faster cycle time, the elimination of hand labor, and a higher quality product having a better finish.

One of the disadvantages to making products of a fiber loaded polyester molding compound is reduction of strength of the product due to fiber breakage. One such thermosetting material is bulk molding compound, which comprises a thermosetting plastics material and glass fibers premixed to form a starting material having a dough-like consistency. Although the use of conventional screw machines are advantageous from the standpoint of short cycle times, by feeding the bulk molding compound into the barrel through the normal feed inlet which is at the rear end of the barrel, the shear forces developed by a conventional plasticizing screw or even a deeper flighted conveying screw tend to break the glass fibers. This results in lower product strength because the short, broken fibers are not as effective a reinforcing constituent as are longer fibers.

In order to minimize fiber breakage, it is desirable to limit, as much as possible, the distance in the barrel through which the material is conveyed. One technique for converting a standard injection molding machine from thermoplastic operation to glass loaded thermosetting operation is to replace the longer thermoplastics barrel with a shorter barrel. One problem with this is that it may take several days to make this conversion, thereby resulting in substantial machine down time and making conversion unfeasible except for very long runs. Furthermore, this requires the customer to stock both a thermoplastics barrel and screw and a barrel and screw specifically adapted for glass loaded thermosetting compounds, an expense which is not affordable unless a substantial portion of the processor's output is such thermosetting compounds.

SUMMARY OF THE INVENTION

The present invention overcomes the disadvantages and problems of prior art apparatus for injecting BMC and other glass loaded thermosetting materials by providing an injection barrel having a normal thermoplastics feed opening at the rear end of the barrel, and also a second feed opening forwardly of the thermoplastics feed opening so that such thermosetting molding compound introduced into the barrel through the second opening will be conveyed within the barrel through a substantially shorter distance than is the case with thermoplastics materials. Thus, the same barrel can be utilized for both BMC and thermoplastics processing, and, as will be seen, conversion from one mode of operation to the other is relatively easy.

When processing thermoplastics materials, the thermoset feed opening is plugged by means of a specially adapted plug having a concave inner surface which conforms to the curvature of the inner surface of the barrel. A conventional plasticizing screw is installed in the barrel, and thermoplastics material fed through the rearward opening by means of a conventional hopper are conveyed forwardly and plasticized by the rotating screw and then injected into the mold as the screw is rammed forwardly. To convert the machine to glass loaded thermoset operation, the plasticizing screw is removed and replaced with a deeper flighted, conveying screw suitable for conveying the thermosetting material forwardly in the barrel without undue breakage of the fibers. This screw preferably is flighted for forward conveyance only as far back as the thermoset inlet, with the rear portion of the screw being unflighted or, alternatively, reverse flighted so that any material which may leak rearwardly in the barrel will be conveyed out of the rear end of the barrel before it has a chance to set up. The thermoset feed opening is unplugged, and a conventional stuffer unit is attached thereto. The material is then forced into the barrel through the unplugged opening and conveyed forwardly by the screw for subsequent injection into the mold as the screw is rammed forwardly.

To convert from glass loaded thermoset to thermoplastic operation, the reverse steps are performed.

Specifically, the present invention contemplates an injection molding machine for alternative glass loaded thermoset and thermoplastic operation comprising an elongated barrel having a generally cylindrical bore therein, an elongated screw rotatably and axially reciprocably received within the bore of the barrel, a first feed opening near the rear end of the barrel extending into the bore through the side wall of the barrel, a second feed opening intermediate the first feed opening and the forward end of the barrel extending into the bore through the barrel side wall, and a cover attachable to the barrel for alternatively closing and opening the second feed opening.

The invention also contemplates a method for converting the injection molding machine from the injection of a thermoplastics compound to a glass reinforced thermosetting polyester compound comprising: providing an injection molding machine having a barrel with a rotating and axially reciprocable plasticizing screw therein, the barrel having a first feed opening and a second feed opening forwardly of the first feed opening;

with the second feed opening closed, feeding thermoplastic compound into the barrel through the first feed opening whereupon the material is conveyed forwardly and plasticized by the rotating screw; with the machine stopped, removing the plasticizing screw and installing a glass loaded thermosetting compound conveying screw in the barrel for rotation and axial reciprocation; opening the second feed opening; and forcing a glass loaded thermosetting polyester compound into the barrel through the second feed opening whereupon the thermosetting compound is conveyed forwardly as the thermosetting compound conveying screw rotates. The converse steps are performed for converting from thermosetting to thermoplastic operation.

BRIEF DESCRIPTION OF THE DRAWINGS

FIG. 5 is a sectional view taken along line 5—5 of FIG. 4 and viewed in the direction of the arrows, wherein the screw has been omitted; and FIG. 6 is a sectional view taken along line 6—6 of FIG. 5 and viewed in the direction of the arrows.

DETAILED DESCRIPTION

Figure 1:
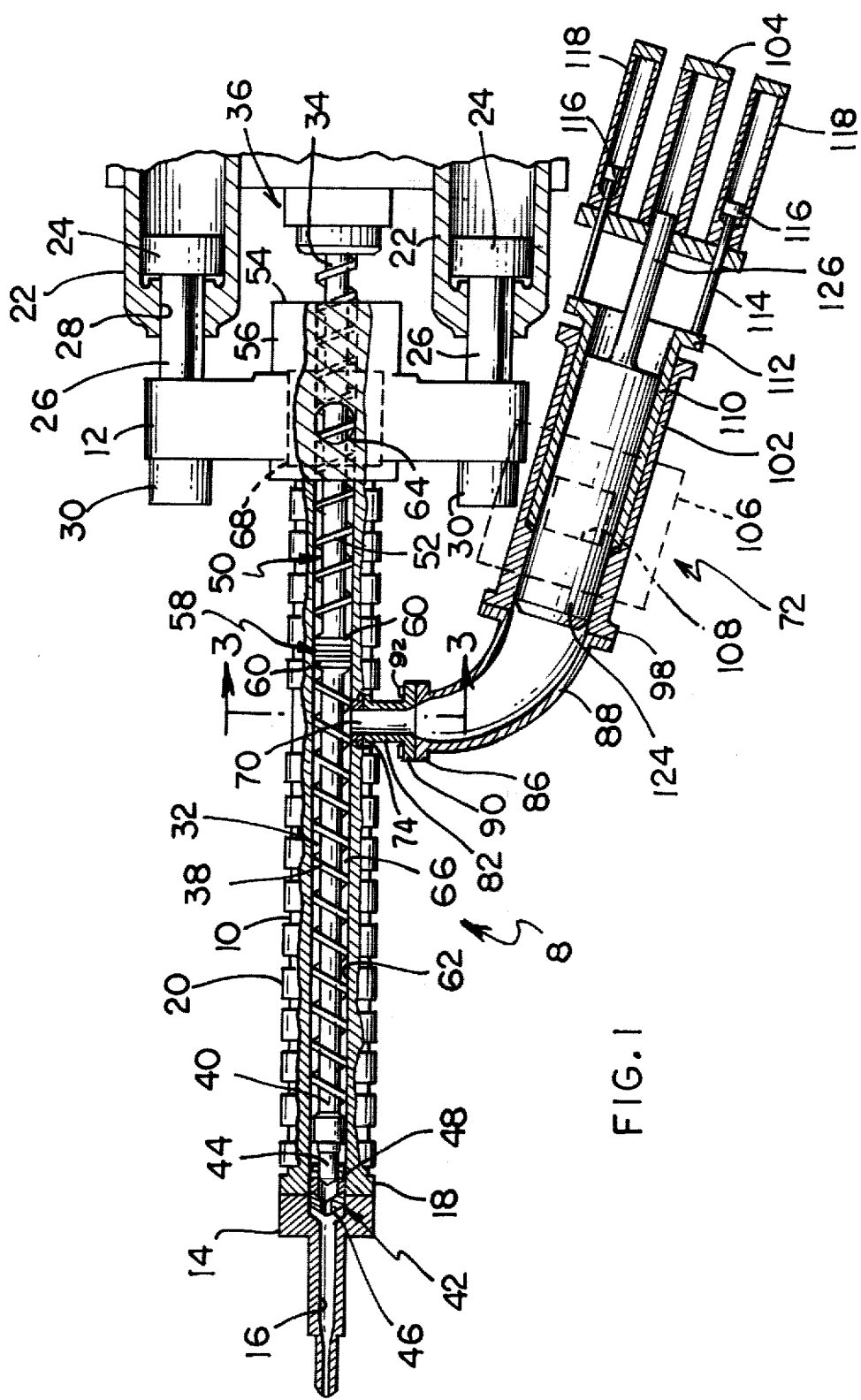
FIG. 1 is a diagrammatic top view, partly in section of an injection molding machine configured for glass loaded thermosetting operation in accordance with the present invention.

With reference now to the drawings, there is illustrated in FIG. 1 an injection molding machine 8 comprising an elongated barrel 10, which may be, for example, a 20:1 barrel, secured to feed chamber 12. Barrel 10 is supported for reciprocal movement in the horizontal direction by conventional apparatus well known in the injection molding art, and is connected to feed chamber 12 by nut 56. Nozzle 14, having flow passage 16 therein, is secured to the forward end 18 of barrel 10, and serves as the means for conveying the softened plastic material to the mold assembly (not shown). A plurality of heating or cooling bands or units 20 are positioned around barrel 10 for the purpose of heating or cooling the plastics material as it is conveyed forwardly within barrel 10.

Injection cylinders 22 have injection pistons 24 received therein for reciprocation in the horizontal direction. Strain rods 26 are secured to rams 24 and extend through openings 28 in cylinders 22. Feed chamber 12 is secured to strain rods 26 by nuts 30.

The injection molding machine 8 illustrated in FIG. 1 is configured for the processing of a thermosetting polyester material, such as a bulk molding compound (BMC), which is reinforced with glass fibers. The bulk molding compound has a sticky, dough-like consistency in its initial state, and for this reason, only conveying of the material is necessary. Plasticizing and melting of the material is not necessary, as is the case with a thermoplastic. Received within barrel 10 is a screw 32 particularly adapted for conveying the bulk molding compound forwardly. The rear end 34 of screw 32 is connected to a hydraulic motor 36, which rotates screw 32 about its longitudinal axis. By means of conventional cylinders 22 reciprocating over pistons 24, screw 32 is reciprocated longitudinally within barrel 10 so that the charge of plastics material can be injected into the mold assembly.

Screw 32 comprises a series of continuous flights 38 having a pitch such that, when screw 32 is rotated counterclockwise when viewing the screw from the forward end 18 of barrel 10, the thermosetting material within barrel 10 will be conveyed forwardly. It will be noted that flights 38 are somewhat deeper than the flights of a conventional plasticating screw, because the primary function of screw 32 is to convey the material forwardly, rather than plasticizing the material by the application of shear forces, as is the case with thermoplastic materials. Connected to the forward end 40 of screw 32 is an annular flow nonreturn valve 42 comprising a retainer 44 threadedly secured to screw 32, and a check ring 46 slidably keyed to retainer 44 by pin 48. The purpose of nonreturn valve 42 is to prevent the backflow of material during injection. The rear portion 50 of screw 32 is also preferably flighted, and comprises a series of continuous flights 52 having a pitch which is reversed to that of flights 38 such that material within the rear portion of barrel 10 will be conveyed rearwardly out the rear end 54 of the barrel 10 before it has a chance to set up. Seal 58, which comprises a plurality of integral, annular ribs 60 having close clearances with the inner wall 62 of barrel 10, prevent or greatly minimize the flow of material rearwardly in barrel 10. Barrel 10 also includes a thermoplastics feed opening 64 extending through the side wall of barrel 10 and communicating with bore 66. A conventional hopper 68 is connected to barrel 10 so as to feed thermoplastics material through opening 64 into barrel 10 when the machine 8 is configured for thermoplastics processing.

Figure 3:
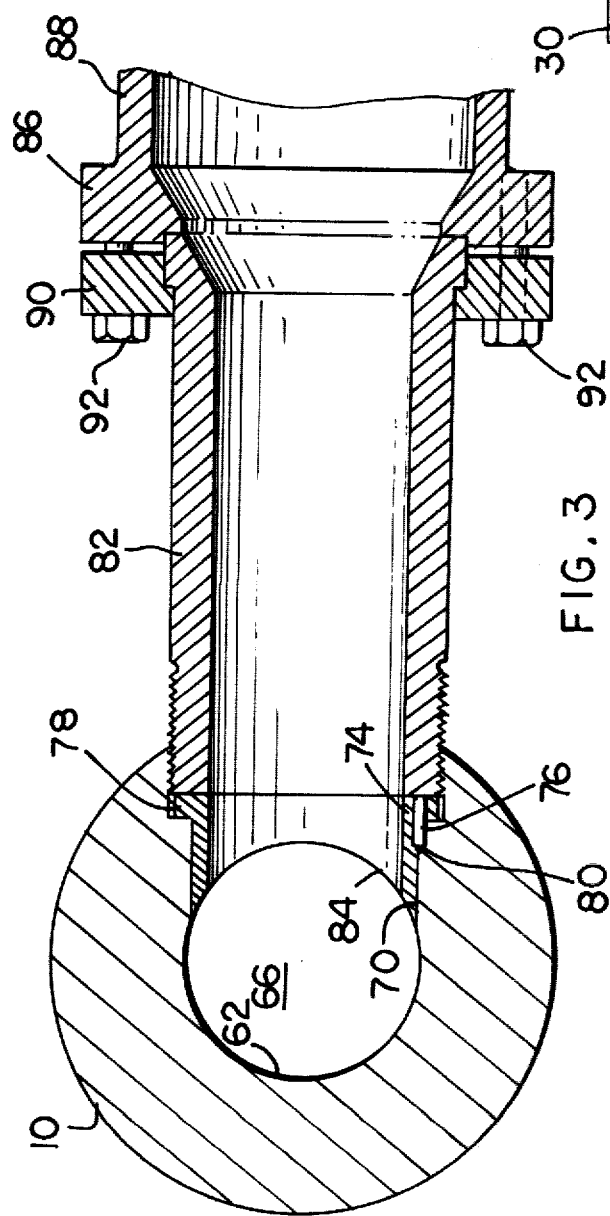
FIG. 3 is a sectional view taken along line 3—3 of FIG. 1 and viewed in the direction of the arrows and wherein the screw has been omitted.

In FIG. 1, however, the machine illustrated is configured, not for thermoplastics processing, but for processing glass loaded thermosetting polyester compounds. For this purpose, barrel 10 is provided with a second feed opening 70, which is generally circular in shape and positioned substantially forwardly of thermoplastics feed opening 64. The thermosetting material, such as a bulk molding compound, is fed into barrel 10 under pressure through opening 70 by means of a conventional stuffer unit 72. With reference to FIG. 3, the stuffer unit 72 is connected to opening 70 by means of liner 74 held against rotation by dowel 76, the latter extending through an opening in the flange portion 78 of liner 74 into a groove 80 in barrel 10. Liner 74 is held in place by sleeve 82, which is threadedly secured to barrel 10. Liner 74 is hollow and generally cylindrical along its axis, and the inner surface 84 thereof is generally concave such that it conforms to the contour of barrel inner surface 62. Sleeve 82 is secured to the flange 86 of stuffer elbow 88 by retainer 90 and screws 92.

Figure 2:
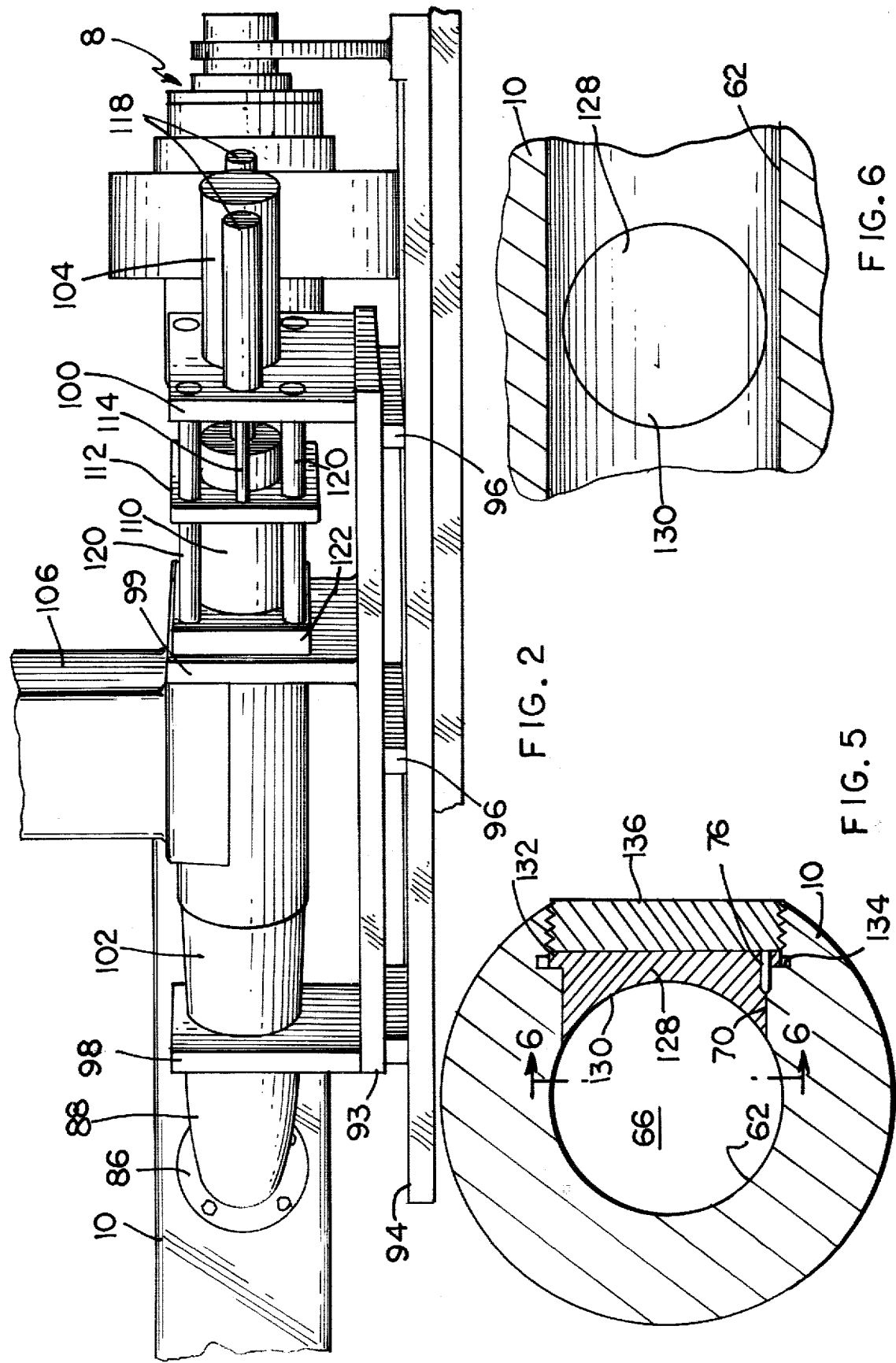
FIG. 2 is a fragmentary side elevational view of the machine shown in FIG. 1.

Stuffer unit 72, which is merely exemplary and does not itself form a part of the invention, will now be described with reference to FIG. 2, wherein the external portions of the stuffer 72 are illustrated, and to FIG. 1 wherein the internal structure is illustrated somewhat diagrammatically. The base plate 93 of stuffer unit 72 is supported on the sled 94 of the injection molding machine 8 by means of spacers 96. Plates 98, 99 and 100 are welded to base plate 93, and support the main stuffer barrel 102, elbow 88 and main hydraulic cylinder 104. A hopper 106 is secured to barrel 102 and has any type of suitable automatic feeding means for causing the thermosetting compound to be fed downward through opening 108 into barrel 102. An inner sealing sleeve 110 is slidably received within barrel 102 and reciprocated by means of sleeve carrier plate 112 to which are secured connecting rods 114. The pistons 116 for connecting rods 114 are actuated within cylinders 118 by means of hydraulic pressure. Carrier plate 112 slides over guide rods 120, which are connected between stop plate 122 and rear plate 100. Inner sealing sleeve 110 is periodically slid rearwardly past opening 108 so that more material can be fed into barrel 102. With sealing sleeve 110 closed, main plunger 124 is urged forwardly by means of the hydraulic pressure developed within cylinder 104 and acting against ram 126. The bulk molding compound within barrel 102 forwardly of plunger 124 will be forced through elbow 88, sleeve 82 and liner 74 into the bore 66 of barrel 10. As screw 32 rotates, the flights 38 on the forward portion thereof will convey the material forwardly within barrel 10. As this occurs, screw 32 will travel rearwardly under the pressure built up in front of nonreturn valve 42 in the conventional manner. When the desired charge has been developed in front of valve 42, screw 32 will be driven forwardly and cause the charge to be injected into the mold assembly through passage 16.

It will be noted that the thermoset feed opening 70 is located substantially forwardly of thermoplastics feed opening 64, for example at least one-third of the effective barrel length in front of opening 64. The seal 58 is located just behind opening 70 when screw 32 is forwardly within barrel 10, and serves to prevent an undue amount of material from flowing rearwardly within barrel 10. Any material which does flow past seal 58, however, will be conveyed out the rear end of barrel 10 by flights 52.

Because the distance along which the material is conveyed by screw 32 is substantially less than that if the material were fed into barrel 10 through the normal feed inlet 64, fiber breakage is greatly reduced. Furthermore, the lower residence time within barrel 10 with the concomitant heating due to shear forces produced as screw 32 rotates, results in a lower temperature rise, which is advantageous when molding with thermosetting materials. Although some temperature rise within barrel 10 is desirable from the standpoint of shorter cycle time, too much rise in temperature will cause premature curing of the thermosetting material. When processing thermosetting materials, such as bulk molding compounds, barrel 10 is cooled by circulating a cooling medium, such as water, through cooling bands or units 20. Conversely, if it is desired to heat barrel 10, then electric heating would be employed. Heating/cooling units 20 are of conventional design.

Figure 4:
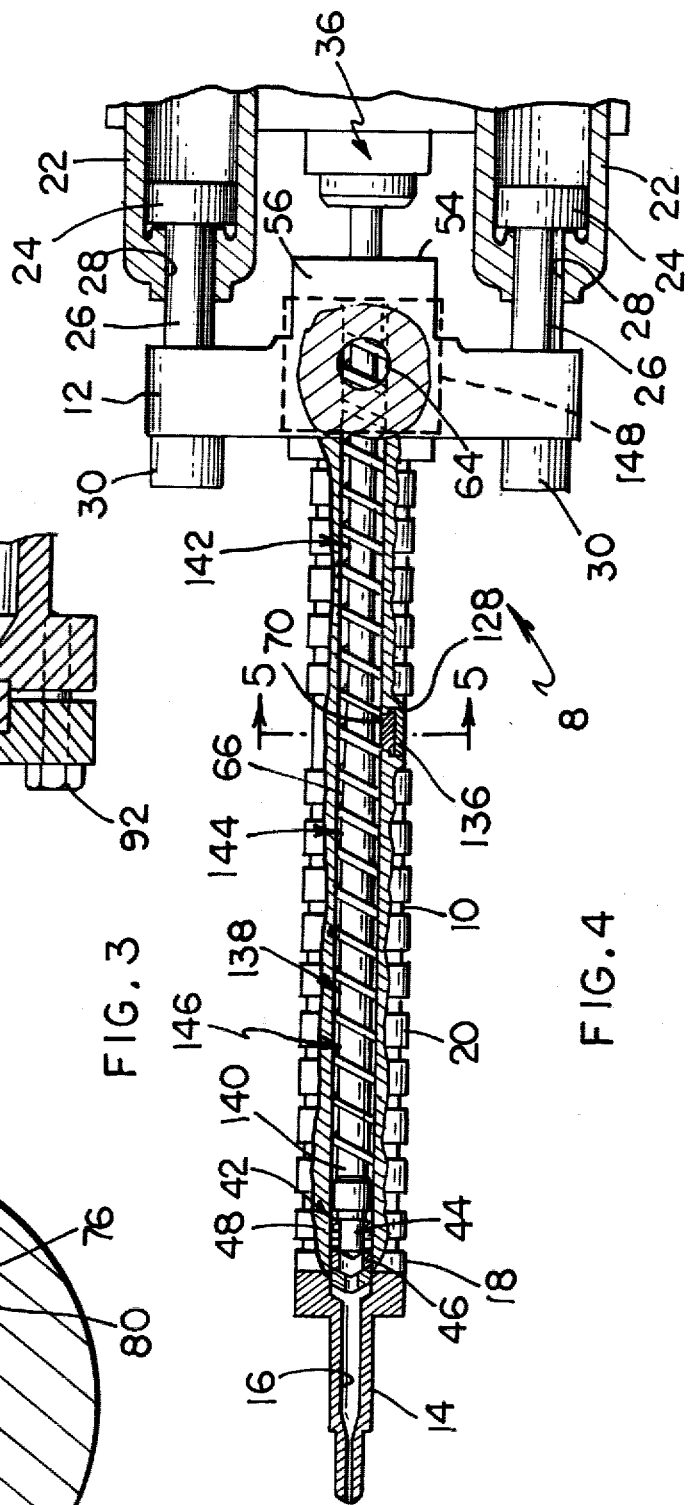
FIG. 4 is a top view, partly in section, of the machine of FIG. 1 but configured for thermosplastic operation.

When it is desired to process thermoplastics materials in injection molding machine 8, it is necessary to convert the machine to the configuration illustrated in FIGS. 4 through 6. Stuffer unit 72 is removed, and thermoset feed opening 70 is plugged by means of plug 128, which has the identical shape as liner 74 but is solid rather than hollow. The inner surface 130 is concave along a direction parallel to the axis of barrel 10 so as to conform to the inner surface 62 of barrel 10. Plug 128 includes a flange portion 132, which engages shoulder 134 and is held against rotation by dowel 76. Plug 128 is held in place by retainer 136, which is threaded into opening 70.

Screw 32 is then removed, and replaced by a conventional plasticizing screw 138, which may have annular flow nonreturn valve 42 or a conventional nonreturn valve threadedly secured to its forward end 140. It will be noted that screw 138 is of conventional design having a deeper flighted conveying section 142 extending forwardly from feed opening 64, a tapered transition section 144, and a shallow channel section 146 on the forward end for the purpose of achieving final plastication once the material has been nearly completely melted. Screw 138 is reciprocated and rotated by the same apparatus as was described in connection with FIG. 1. Electric heating bands or units 20 impart additional thermal energy to the thermoplastic material thereby accelerating its melting.

The thermoplastic compound, which may be in pelletized form, is fed from hipper 148 through feed opening 64 into the bore 66 in barrel 10. The material is conveyed forwardly by screw 138 and plasticated so that it is in molten form as it builds up in front of nonreturn valve 42. The increase in pressure in front of valve 42 causes screw 138 to retract, and once the desired charge has been formed, screw 138 is rammed forwardly so as to inject the charge through nozzle 14 into the mold assembly. The operation of the injection molding machine 8 in the thermoplastic configuration shown in FIG. 4 is completely conventional in nature.

In order to convert the machine back to the glass loaded thermoset configuration, all that is necessary, is to replace screw 138 with screw 32, remove plug 128 and retainer 136 and replace them with liner 74 and sleeve 82, remove the hopper 148 from barrel 10, and attach the stuffer unit 72. As mentioned earlier, this conversion can be accomplished within a matter of hours, as opposed to prior art machinery wherein the replacement of the entire barrel assembly requires days.

The present invention is not limited to the processing of BMC when in the configuration illustrated in FIG. 1, but is useful when it is desired that minimal shear forces be imparted to the material by the screw.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. In an injection molding process wherein a charge of plastics material is injected into a mold by means of a rotating and reciprocating screw, a method of converting from the injection of a thermoplastics compound to a fiber reinforced thermosetting compound comprising:
   providing an injection molding machine having a barrel with a rotating and axially reciprocable plasticizing screw therein, the barrel having a first feed opening and a second feed opening forwardly of the first feed opening,
   with the second feed opening closed, feeding thermoplastic compound into said barrel through the first feed opening whereupon the material is conveyed forwardly and plasticized by the rotating screw,
   with the machine stopped, removing the plasticizing screw and installing a thermosetting compound conveying screw in said barrel for rotation and axial reciprocation,
   opening the second feed opening, and
   forcing a thermosetting compound having fibers dispersed therein into said barrel through the second feed opening whereupon the thermosetting compound is conveyed forwardly as the thermosetting compound conveying screw rotates.

2. The method of claim 1 wherein the plasticizing screw is flighted for forward conveyance of the plastic material along nearly its entire length and at least forwardly of the first feed opening, and the thermosetting compound conveying screw is flighted for forward conveyance only on its forward portion and as far rearward as the second feed opening when the conveying screw is forwardly in the barrel.

3. The method of claim 1 wherein the thermosetting compound is a glass loaded thermosetting polyester compound.

4. In an injection molding process wherein a charge of plastics material is injected into a mold by means of a rotating and reciprocating screw, a method for converting from the injection of a fiber reinforced thermosetting compound to a thermoplastics compound comprising:

providing an injection molding machine having a barrel with a rotating and axially reciprocable thermosetting compound conveying screw therein, the barrel having a first feed opening and a second feed opening forwardly of the first feed opening, with the second feed opening open, forcing a thermosetting compound having fibers dispersed therein into the barrel through the second feed opening whereupon the thermosetting compound is conveyed forwardly as the conveying screw rotates, with the machine stopped, removing the conveying screw and installing a plasticizing screw in the barrel for rotation and axial reciprocation, covering the second feed opening, and feeding thermoplastic compound into the barrel through the first feed opening whereupon the material is conveyed forwardly and plasticized by the rotating plasticizing screw.

5. The method of claim 4 wherein the plasticizing screw is flighted for forward conveyance of the plastic material along nearly its entire length and at least forwardly of the first feed opening, and the thermosetting compound conveying screw is flighted for forward conveyance only on its forward portion and as far rearward as the second feed opening when the conveying screw is forwardly in the barrel.

6. The method of claim 4 wherein the thermosetting compound is a glass loaded thermosetting polyester compound.

7. The method of claim 6 wherein the thermosetting compound is a bulk molding compound.

* * * * *